(12) United States Patent
Degenaro et al.

(10) Patent No.: US 6,760,812 B1
(45) Date of Patent: Jul. 6, 2004

(54) SYSTEM AND METHOD FOR COORDINATING STATE BETWEEN NETWORKED CACHES

(75) Inventors: Louis R. Degenaro, White Plains, NY (US); Arun K. Iyengar, Yorktown Heights, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 09/684,179

(22) Filed: Oct. 5, 2000

(51) Int. Cl.[7] .............................................. G06F 12/00
(52) U.S. Cl. ....................... 711/133; 711/119; 711/136; 711/137; 711/141
(58) Field of Search ............................... 711/119, 130, 711/133, 136, 137, 141

(56) References Cited

U.S. PATENT DOCUMENTS 5,590,308 A  * 12/1996  Shih ........................... 711/136
6,519,685 B1 *  2/2003  Chang ......................... 711/141

* cited by examiner

Primary Examiner—Donald Sparks
Assistant Examiner—Bao Q Truong
(74) Attorney, Agent, or Firm—F. Chau & Associates, LLC

(57) ABSTRACT

A system and method are provided for sharing and caching information in a data processing system and for efficiently managing a cacheable state shared among processes and clones. In one aspect, a method for managing a plurality of caches distributed in a network comprises maintaining, by each cache, a plurality of statistics associated with a cacheable object, wherein the statistics associated with the cacheable object comprise an access frequency ($A(o)$), an update frequency ($U(o)$); an update cost ($C(o)$), and a cost to fetch the cacheable object from remote source ($F(o)$); computing, by each cache, a metric using said statistics, wherein the metric quantitatively assesses the desirability of caching the cacheable object; and utilizing the metric, by each cache, to make caching decisions associated with the cacheable object.

24 Claims, 11 Drawing Sheets

SYSTEM AND METHOD FOR COORDINATING STATE BETWEEN NETWORKED CACHES

BACKGROUND

1. Technical Field

The present application is generally related to a system and method for sharing and caching information in a data processing system and, in particular, to a system and method for managing a cacheable state which is shared between processes and clones in a computer network.

2. Description of Related Art

Caching is a technique that is typically employed in many computer systems to improve performance. For example, in an object-oriented environment, caching an object can minimize the cost for fetching or materializing an object since it is only incurred once. Subsequent requests can be satisfied from the cache, a step which incurs significantly less overhead, thus resulting in improved performance overall.

A key problem associated with caching items is that of preventing each cache from supplying stale data. Cached data become stale whenever actual values have changed but cached copies of these values have not been updated to reflect the changes. Since it is most undesirable to supply stale data, caches typically purge stale data and request a fresh copy from the data source. This replenishment incurs the usual overhead that employment of caches seeks to minimize.

A "model" is a template for creating additional, nearly identical copies of a server or process instance, such as an application server or servlet engine. Such copies are called "clones". The act of creating clones is called cloning. A clone (or cloned process) is a special case of a process. Such processes and clones comprise many computer systems. Cloning allows multiple copies of the same object to behave together as if they were a single image, with the idea that clients experience improved performance. More specifically, processes and clones often perform particular tasks and communicate with other process and clones performing the same or other tasks. There are various benefits associated with having separate processes and clones perform individual tasks, including but not limited to reusability, understandability, and efficiency.

Processes and clones often utilize caches to improve performance. A key problem with separate processes and clones is that of keeping their caches consistent. A process or clone cache becomes inconsistent when changes occur that affect the cache, either within the process or clone itself or within another process or clone.

In order to alleviate the problem of unusable cached data at request time among processes and clones, there is a need for a mechanism to efficiently coordinate changes that would cause a cache to become stale. Also, there is a need to effectively measure the costs and benefits associated with keeping distributed caches synchronized and to determine optimal entity cacheabilities.

SUMMARY OF THE INVENTION

The present invention is directed to a system and method for sharing and caching information in a data processing system and for efficiently managing a cacheable state shared among processes and clones. In one aspect of the present invention, a method for managing a plurality of caches distributed in a network, comprises the steps of:

maintaining, by each cache, a plurality of statistics associated with a cacheable object, wherein the statistics associated with the cacheable object comprise an access frequency ($A(o)$), an update frequency ($U(o)$), an update cost ($C(o)$), and a cost to fetch the cacheable object from remote source ($F(o)$);

computing, by each cache, an associated metric using said statistics, wherein the associated metric quantitatively assesses the desirability of caching the cacheable object; and utilizing, by a given cache, the associated metric to make caching decisions associated with the cacheable object.

In another aspect of the present invention, a method for managing a cacheable state shared between a plurality of caches associated with communicating processes, comprises the steps of:

caching, by a process, an object in a cache associated with the process;

maintaining, by the process, dependency information associated with the cached object;

utilizing, by the process, the dependency information of the cached object to determine if the cached object is affected by a change to underlying data; and updating all caches associated with other processes containing the cached object, if the cached object is affected by a change to underlying data.

In yet another aspect of the present invention, a system for managing networked caches, comprises:

a plurality of communicating processes, wherein each communication process is associated with a cache; and a cache manager, associated with each process, for managing the associated cache and maintaining dependency information for each object stored in the cache, wherein the cache manager is adapted to share the dependency information among other communication processes.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

It is to be understood that the system modules and method steps described herein may be implemented in various forms of hardware, software, firmware, special purpose processors, or a combination thereof. In particular, the present invention is preferably implemented as an application comprising program instructions that are tangibly embodied on one or more program storage devices (e.g., magnetic floppy disk, RAM, ROM, CD ROM and/or Flash memory) and executable by any device or machine comprising suitable architecture. It is to be further understood that, because some of the constituent system modules and process steps depicted in the accompanying Figures are preferably implemented in software, the actual connections between such components may differ depending upon the manner in which the present invention is programmed. Given the teachings herein, one of ordinary skill in the related art will be able to contemplate these and similar implementations or configurations of the present invention.

Figure 1:
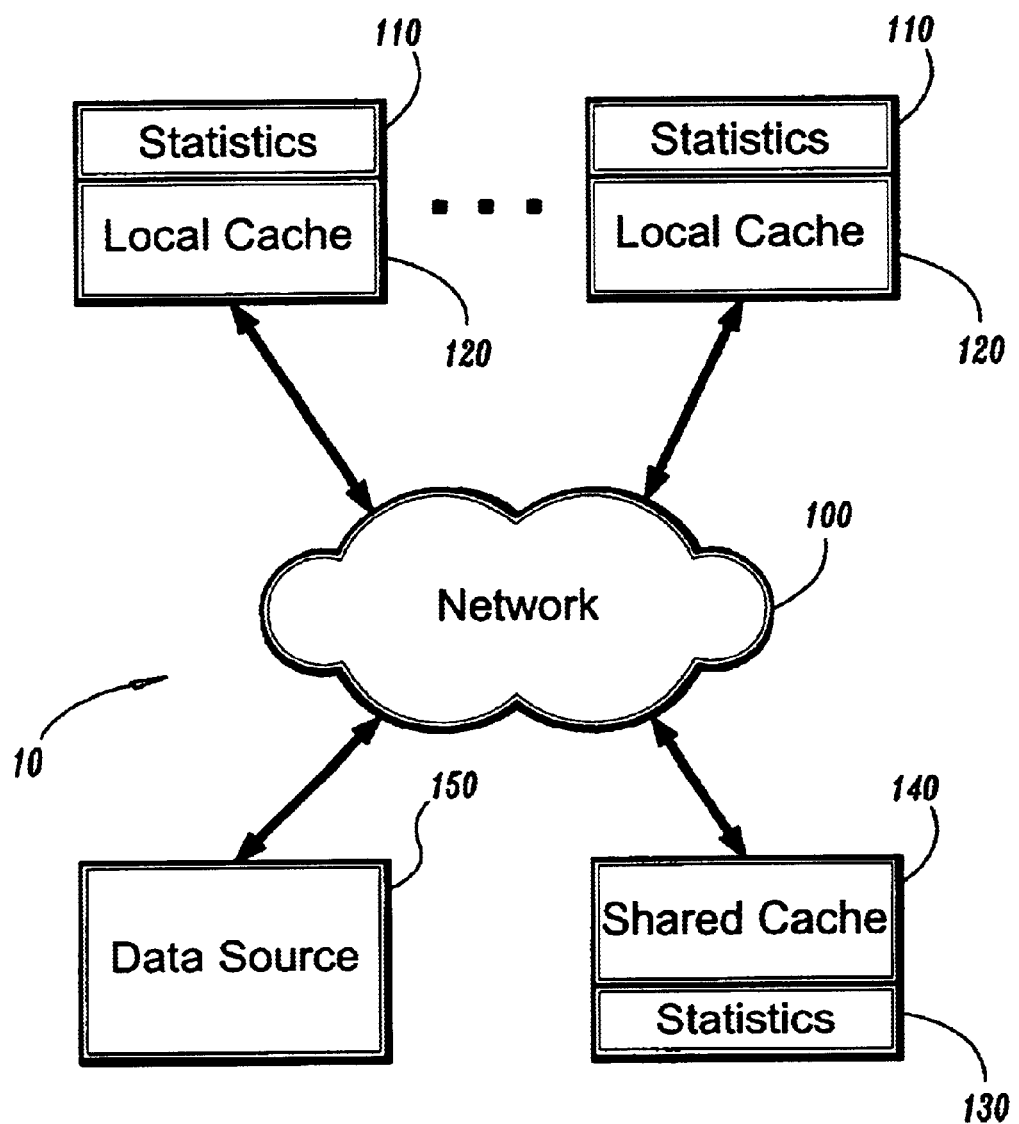
FIG. 1 is a block diagram of a system according to an embodiment of the present invention for caching objects in a network comprising local caches and a shared cache using cache statistics.

Referring now to FIG. 1, a block diagram illustrates a system according to an embodiment of the present invention for caching information among a plurality of network-connected caches. The system 10 comprises a plurality of local caches 120 and a shared cache 140 which are remotely accessible over a network 100. It is to be understood that each local cache 120 may correspond to any one of various entities including, but not limited to, a processor, server, process, or clone. The data stored in any one of the caches is obtained via, e.g., data source 150. It is to be understood that the data stored in the caches may comprise any cacheable information such as query results and dynamic WWW data.

The local caches 120 store statistics 110 and the shared cache maintains statistics 130. As explained in greater detail below, the statistics 110, 130 are generated and maintained by the respective caches for making caching decisions regarding storing objects or groups of objects in caches either locally or remotely. In the event that an entity cannot find an object in its local cache, it can try to obtain the object either from the shared cache 140 or another local cache 120. Such accesses to remote caches are more expensive than accesses to the entity's local cache 120. Fetching the object from a remote cache, however, is less expensive than fetching the object from the remote data source 150.

A key feature of the present invention is that it provides methods for storing information across multiple caches in order to optimize performance. An advantage to storing data in a cache is that the entity corresponding to the cache can access the data more quickly than if it is stored more remotely. Disadvantages to storing data in a cache might include the overhead of keeping cached copies updated and/or the space overhead consumed by keeping a copy in the cache. In view of the advantages and disadvantages to caching objects, a method is described herein that allows an entity to quantitatively evaluate the advantages and disadvantages to make decisions of whether an object should be cached.

Figure 2A:
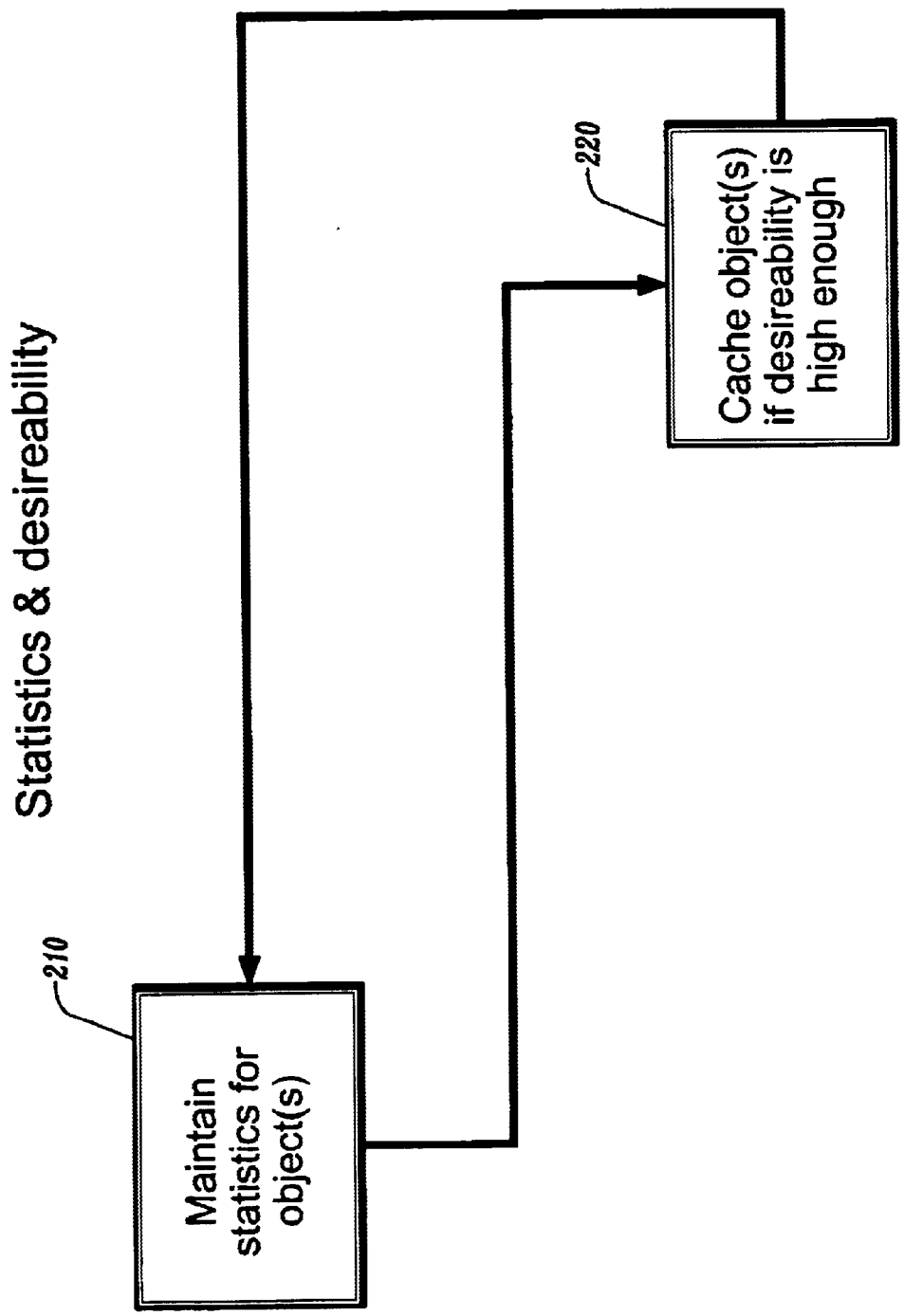
FIG. 2a is a flow diagram of a method for determining when to cache objects locally or remotely in a shared cache, according to one aspect of the present invention.
Figure 2B:
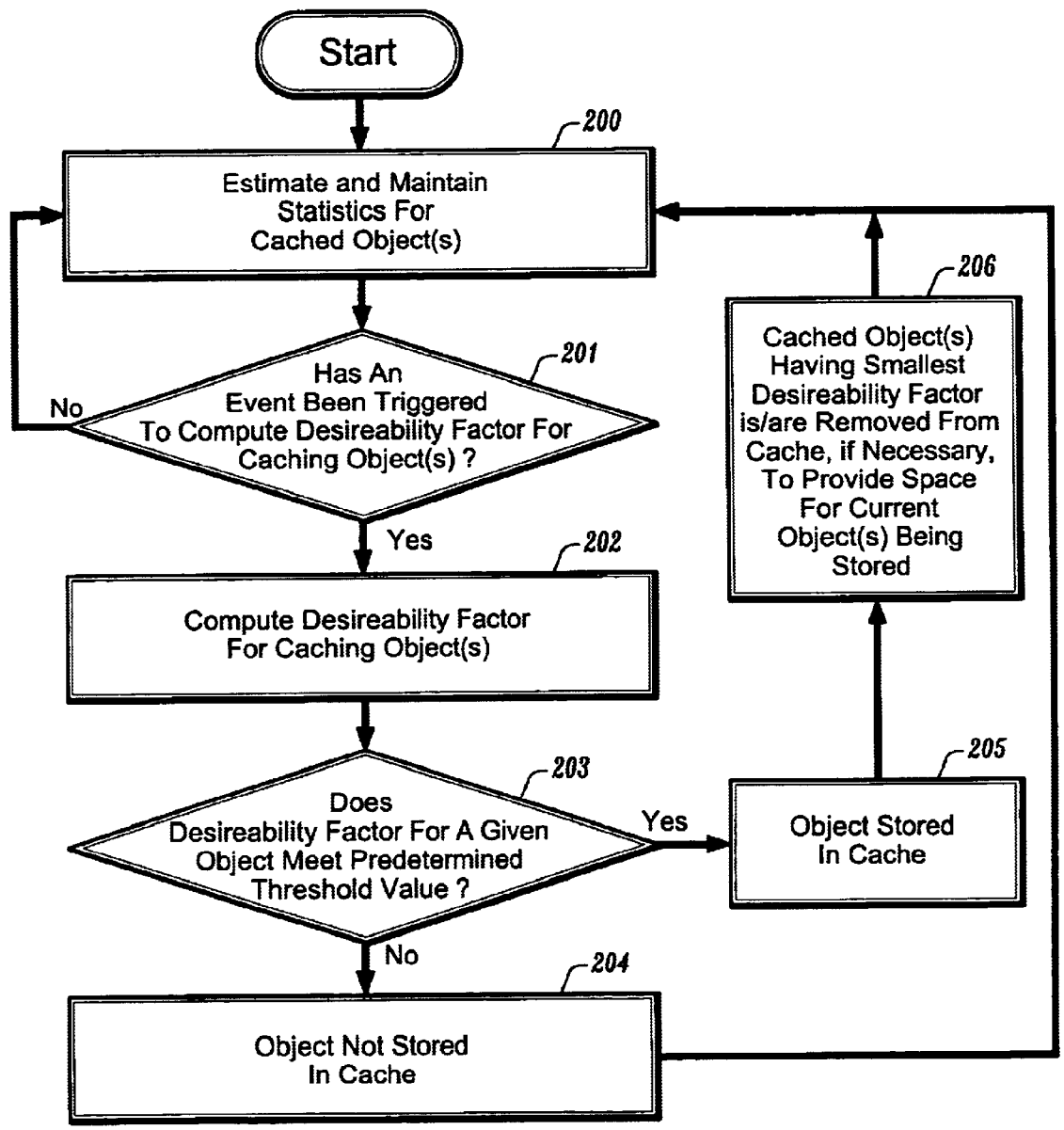
FIG. 2b is a flow diagram of a method for determining when to cache objects locally or remotely in a shared cache, according to another aspect of the present invention.

FIGS. 2a and 2b illustrate methods that may be implemented in any system comprising a network of caches for evaluating desirability in caching an object (either locally or remotely) based on statistics. For instance, as explained in detail below, these methods may be employed in a network of caches that further comprises mechanisms that synchronize data exchanges between the caches and maintain consistency amongst the network caches.

Referring to FIG. 2a, each of the local and shared cache managers (in FIG. 1) maintain statistics for each object stored in their respective caches (step 210). Preferably, each of the local and shared cache managers will cache a given object if a computed desirability is high enough (step 220).

FIG. 2b, illustrates in further detail a preferred process for implementing the method of FIG. 2a. As indicated above, a given cache (local cache 120 or shared cache 140) maintains statistics for cached object(s) (step 200). More specifically, the statistics maintained by a given cache for a particular object include, for example, the following:

A(o): the access frequency for object o (e.g. # of accesses per unit time);

F(o): the cost to fetch o if o is not cached;

U(o): the update frequency for o (e.g. # of updates per unit time); and

C(o): cost to update cached copy.

These quantities may be estimated using suitable conventional techniques known to those skilled in the art. Preferably, the methods for estimating these quantities as described in U.S. patent application Ser. No. 08/958,506, entitled: "A New Algorithm for Cache Replacement", filed on Oct. 27, 1997 which is commonly assigned and incorporated herein by reference, are implemented herein. The above values are used as input to calculate a desirability for caching an object (as described below).

When a prespecified event has been triggered for computing a desirability factor for caching an object (affirmative decision is step 201), a desirability factor will be computed using, for example, the statistics (values indicated above) maintained by the cache (step 202). There are various factors that are considered when making decisions about storing an object in a cache. In one embodiment, where the size of the cache is not a limiting factor, the desirability of storing an object o in a cache is preferably computed as follows:

$$d1(o)=A(o)*F(o)-U(o)*C(o)$$

In another embodiment, if cache size is a limiting factor, the desirability of storing an object in a cache is preferably computed as follows:

$$d2(o)=d1(o)/size(o),$$

where size(o) is the size of object o.

After the relevant desirability factor is computed step 202), a determination is made as to whether the computed factor meets a predetermined value (step 203). For instance, if the d1 value of the given object is positive (affirmative determination in step 203), the object will be cached (step 205). It is to be understood that depending on the given application, the object being stored may be stored either locally and/or remotely in one or more remote caches.

In addition, when cache size is considered, the system will cache objects having the highest positive d2 values (step 205). In particular, whenever an object needs to be removed from the cache in order to make space for another object, a cached object with one of the lowest d2 values is selected for removal (step 206). In particular, one or more cached objects may need to be removed to provide storage space for an object being stored. A preferred method for selecting cached object(s) with the lowest d2 value(s) comprises using a priority queue or a method described in the above-incorporated U.S. Ser. No. 08/958,506. Again, it is to be understood that depending on the application, the object being stored may be stored either locally and/or remotely in one or more remote caches.

It is to be appreciated that because the d1 and d2 values for a given object may frequently change, maintaining updated values for d1 and d2 for the given object may be prohibitively expensive. But it is not always necessary to recalculate a new d1 or d2 value of an object each time such a quantity might have changed. For example, as indicated above, these values may be updated when one of a plurality of predetermined trigger events occur (step 201). Such trigger events comprise events such as when an object is accessed, updated, or invalidated.

It is to be understood that the methods depicted in FIGS. 2a and 2b may be implemented in the system of FIG. 1 to provide, e.g., efficiency via cache statistics and desirability of caching without regard for shared cache consistency. In another embodiment of the present invention, the methods of FIGS. 2a and 2b may be implemented in conjunction with methods for maintaining consistency among the plurality of network caches depicted, for example, in FIG. 1. More specifically, the following system and methods provide mechanisms for coherently maintaining distributed state information among, e.g., clones or processes (such as query results).

Figure 3:
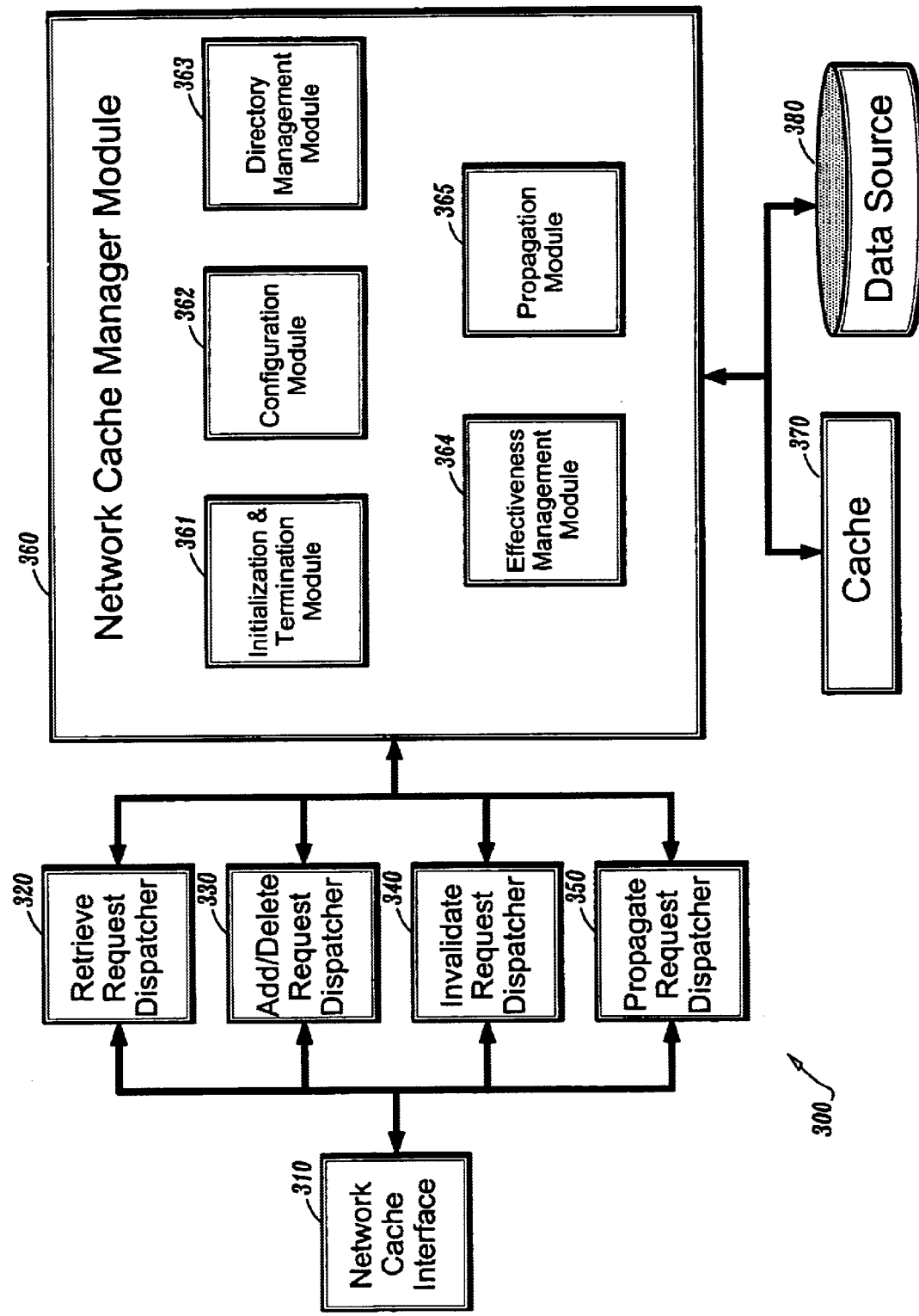
FIG. 3 is a block diagram of a system for managing shared cacheable entities according to an embodiment of the present invention.

Referring now to FIG. 3, a block diagram illustrates a data processing system 300 according to a preferred embodiment for managing a network cache of cacheable entities. It is to be understood that the system depicted in FIG. 3 is implemented in each entity having one or more caches that are shared with other caches distributed over a network. In general, the data processing system 300 comprises a network cache interface 310 (application program interface), a plurality of request dispatchers 320–350), a network cache manager module 360 (or "cache manager"), a local cache 370 and a data source 380 (such as a database). The cache interface 310 provides an API for communication between outside entities and the system 300. For example, an outside entity might be a client application program seeking to utilize shared state information (locally stored in cache 370) previously obtained from a remote server over a network, or a remote server providing updated information to the local cache 370 about a changed object or set of objects.

The cache 370 is that which is managed by the network cache manager module 360, and for the purposes of discussion it is assumed that the data source 380 (local or remote) stores all of the relevant data.

The network cache interface 310 routes various requests to and from dispatcher modules 320–350. For instance, retrieval requests are routed to/from a retrieve request dispatcher 320, add and delete requests are routed to/from an add/delete request dispatcher 330, invalidation requests are routed to/from an invalidate request dispatcher 340, and propagation requests are routed to/from a propagate request dispatcher 350. Each of these request dispatcher modules 320–350 independently interact with the cache manager 360.

The cache manager 360 comprises a plurality of modules, each of which are employed at various times to perform specific functions. In a preferred embodiment, the cache manager 360 comprises an initialization/termination module 361, a configuration module 362, a directory management module 363, an effectiveness management module 364, and a propagation module 365. The function of each of these modules will now be discussed.

The initialization module 361 performs those tasks that are required to be initially performed before streams of retrieve, add, delete, invalidate, and propagate requests are processed. The tasks that are performed by the initialization module 361 comprise initializing the actual cache 370, initializing the directory 363 of nodes, objects, and dependencies, and pre-fetching objects that are desired and/or likely to be used into the cache 370. A preferred method of operation of the initialization module 361 will discussed in detail below with reference, e.g., to FIG. 5.

The configuration module 362 comprises configuration data and is called upon to supply the necessary configuration data for the initialization process and other processes.

The directory management module 363 is responsible for consistently maintaining dynamically changing information among one or more network caches, which may be arranged in hierarchies. Specific details of preferred directory management processes are described below, e.g., with reference to FIGS. 6–9.

The effectiveness management module 364 preferably utilizes the statistics discussed above with reference to FIGS. 2a and 2b for determining which entities should/ should not be cached. It is to be appreciated that the cache managers (which are in coordinated communication in a network) collectively measure the effectiveness of the continued caching of particular objects. If the cost of message overhead to effect such synchronized communication outweigh the benefits of caching the objects, then the objects are expunged from the cache. The propagation module 365 is responsible for efficiently sharing information amongst cooperating network cache managers.

Each request dispatcher first determines whether or not the network cache management module 360 has been initialized. If the network cache management module 360 has not been initialized, then an initialization module 361 is called upon to prepare the network cache management module 360 for requests. After the network cache management module 360 has been initialized, the retrieval request dispatcher 320 utilizes the directory management module 363 to obtain desired information (e.g., an object); the add/delete request dispatcher 330 utilizes the directory management module 363 to perform a requested addition or deletion process; the invalidate request dispatcher 340 utilizes the directory management module 363 to perform a requested invalidation; the propagate request dispatcher 350 utilizes the directory management module 363 to perform a propagation process. Specific details of components of system 300 will be discussed below with reference to the associated figures.

Figure 4:
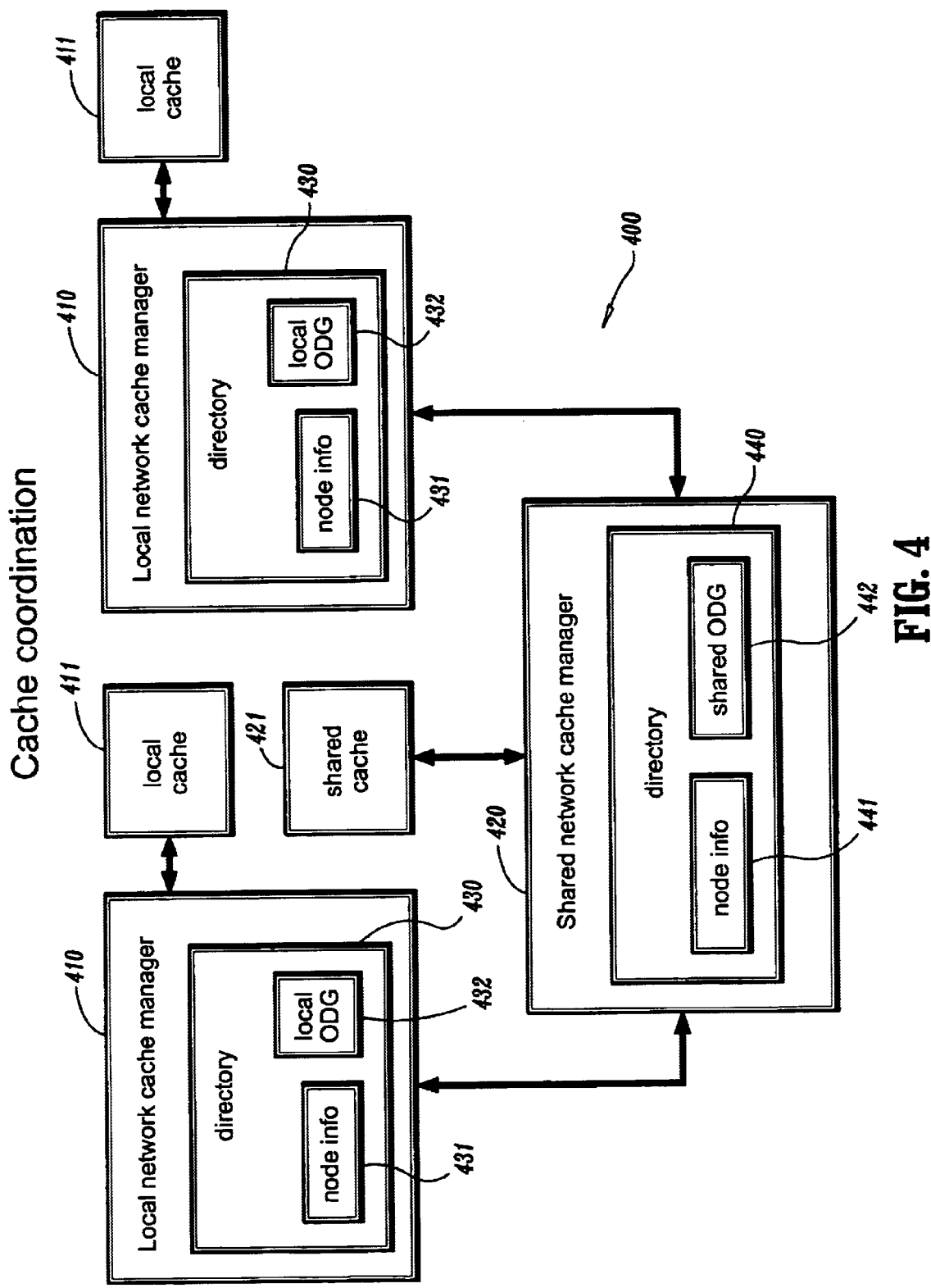
FIG. 4 is a block diagram of a system according to another embodiment of the present invention for caching information among a plurality of caches that are distributed over a network.

Referring now to FIG. 4, a block diagram illustrates a system 400 according to another embodiment of the present invention for caching information among a plurality of caches that are distributed over a network. More specifically, FIG. 4 illustrates a cache coordination diagram depicting a plurality of local network cache managers 410 (or "local cache manager") and a shared network cache manager 420 (or "shared cache manager"), each residing at a "node"(or host) in a network. It is to be noted that each cache manager 410, 420 preferably comprises an architecture of the cache manager 360 of FIG. 3, but further illustrating components of the directory management module 363. As depicted in FIG. 4, the local cache managers 410 each manage a respective local cache 411, and the shared cache manager 420 manages a shared cache 421. In addition, the local cache managers 410 each maintain a respective directory 430 (via the directory management module 363 of FIG. 3) comprising a local ODG (object dependency graph) 432 and node information 431. The shared cache manager 420 maintains a directory 440 comprising a shared ODG 442 and node information 441.

As is known in the art, an ODG comprises a directed graph which represents and maintains data dependence information between objects that are cached and the underlying data which periodically changes and affects the values of such cached objects. An ODG is preferably used in conjunction with a DUP (data update propagation) process to maintain the data dependencies. More specifically, in a system that employs DUP, when the system becomes aware of a change to underlying data, it examines the stored dependence information to determine which cached objects, if any, are affected by the change to the underlying data (e.g., the cache manager uses the dependency information in the ODG to determine which cached object(s) need to be invalidated or updated as a result of the change(s) to the underlying data). A preferred DUP process and ODG framework are described, for example, in U.S. Pat. No. 6,026,413 to Challenger, et al., entitled "Determining How Changes to Underlying Data Affect Cached Objects," which is commonly assigned and incorporated herein by reference. It is to be appreciated that other suitable techniques for maintaining dependency relationships between cached entities and underlying data may be employed in the present invention.

The shared ODG 442 maintained by the shared cache manager 420 comprises dependencies of all objects located at each of the network-connected nodes. Although the shared ODG may be centralized and located solely in the directory 440 of the shared cache manager 420, preferably, the shared ODG 442 is distributed in such a way that each directory 430 of the local cache managers 410 maintains a local ODG 432 comprising relevant portions of the shared ODG 442. Advantageously, the distribution of the shared ODG 442 provides high availability and low competition for the ODG resource.

Furthermore, the node information 431, 441, which is maintained in the respective directories 430, 440 of the respective cache managers 410, 420, augments the associated ODG. Preferably, the node information 431, 441 comprises information that allows network cache managers to locate and communicate with one another. For example, where the network cache managers are implemented in an EJB (enterprise javabeans) framework, and deployed, e.g., in IBM WebSphere™ Servers, node information comprises information such as the initial context, protocol, host port and home. As explained in detail below, the node information 431, 441 is used by the respective cache managers 410, 420 to minimize invalidation traffic among several nodes by targeting those nodes that are specifically affected when, e.g., invalidation events occur.

One advantageous feature of the system 400 of FIG. 4 invention is that it provides efficient methods for sharing complex information in order to maintain cache consistency among cooperating caches. The system 400 provides a mechanism to maintain distributed state information among a plurality of networked caches. The coordination among the network cache managers comprises sharing dependencies, invalidations, and object-in-cache locales. For example, when an invalidation event (i.e., one or more locally cached objects are invalidated) occurs at a local cache manager 410, the local ODG 432 is consulted to maintain the local cache 411 (e.g., by removing an invalidated object from the local cache 411). In addition, the locally maintained node information 431 is consulted to determine other local and/or shared cache managers 410, 420, if any, that need to be notified of the invalidation. Typically, either none or one other shared cache manager 420 will need to be notified of the invalidation by the local cache manager 410. It is then the responsibility of the shared cache manager 420 to propagate the invalidation event to all other local and shared cache managers 410, 420, if any, by consulting its shared ODG 442 and node information 441.

Similarly, whenever an object and its dependencies are added to (or deleted from) a local cache 411, the local cache manager 410 consults the locally maintained directory 430 in order to determine other network cache managers 410, 420, if any, that need to be notified of the changes. Typically, either none or one other shared cache manager 420 will need to be notified of the event by the local cache manager 410. It is then the responsibility of the shared cache manager 420 to propagate the addition(s) (or deletion(s)) to all other network cache managers 410, 420, if any, by consulting its shared ODG 442 and node information 441.

In addition, when a given network cache manager 410, 420 is requested to produce an object that does not currently exist within its associated cache 411, 421, the network cache manager 410, 420 consults its associated directory 430, 440 to find a node to contact from which it can fetch the object from another cooperating network cache manager 410, 420.

It is to be understood that the architecture of the system 400 in FIG. 4 illustrates an exemplary embodiment and that there are an infinite number of possible configurations and arrangements that may be implemented among network cache managers. For example, a network cache manager could be utilized by a single process or by multiple processes. In addition, network cache managers could be arranged hierarchically. Moreover, some or all of the information utilized and maintained by a network cache manager may be contained within the associated cache it manages.

It is to be understood that any suitable messaging mechanism (e.g., data exchange beans and an implied shared persistence) may be used in the system 400 to facilitate information distribution among the network cache managers 410, 420. Preferably, the messaging mechanism of a given network cache manager comprises various attributes comprising a current sequence number that is incremented each time one of its other attributes is changed, an historical sequence number that indicates the oldest event that is still retrievable, a name attribute to identify the particular shared entity, an ODG attribute representing the combined ODGs of all local cache managers 410, an ODG update attribute to retain recent addition(s) and/or removal(s), and an invalidation update attribute to maintain recent invalidations.

It is to be appreciated that any suitable message exchange protocol may be implemented herein. Although an implied shared persistence mechanism together with the sequence number comprises a particular messaging scheme for the cache of CMP (container managed persistence) EJBs (enterprise javabeans), such information may be utilized for any suitable messaging protocol to allow each cache manager to decide whether or not it is appropriate to attempt fetching data from a remote cache to keep its local cache current, or to simply invalidate entries that are older than a given date (i.e., dates prior to that which is retrievable from peer network cache managers).

Figure 5:
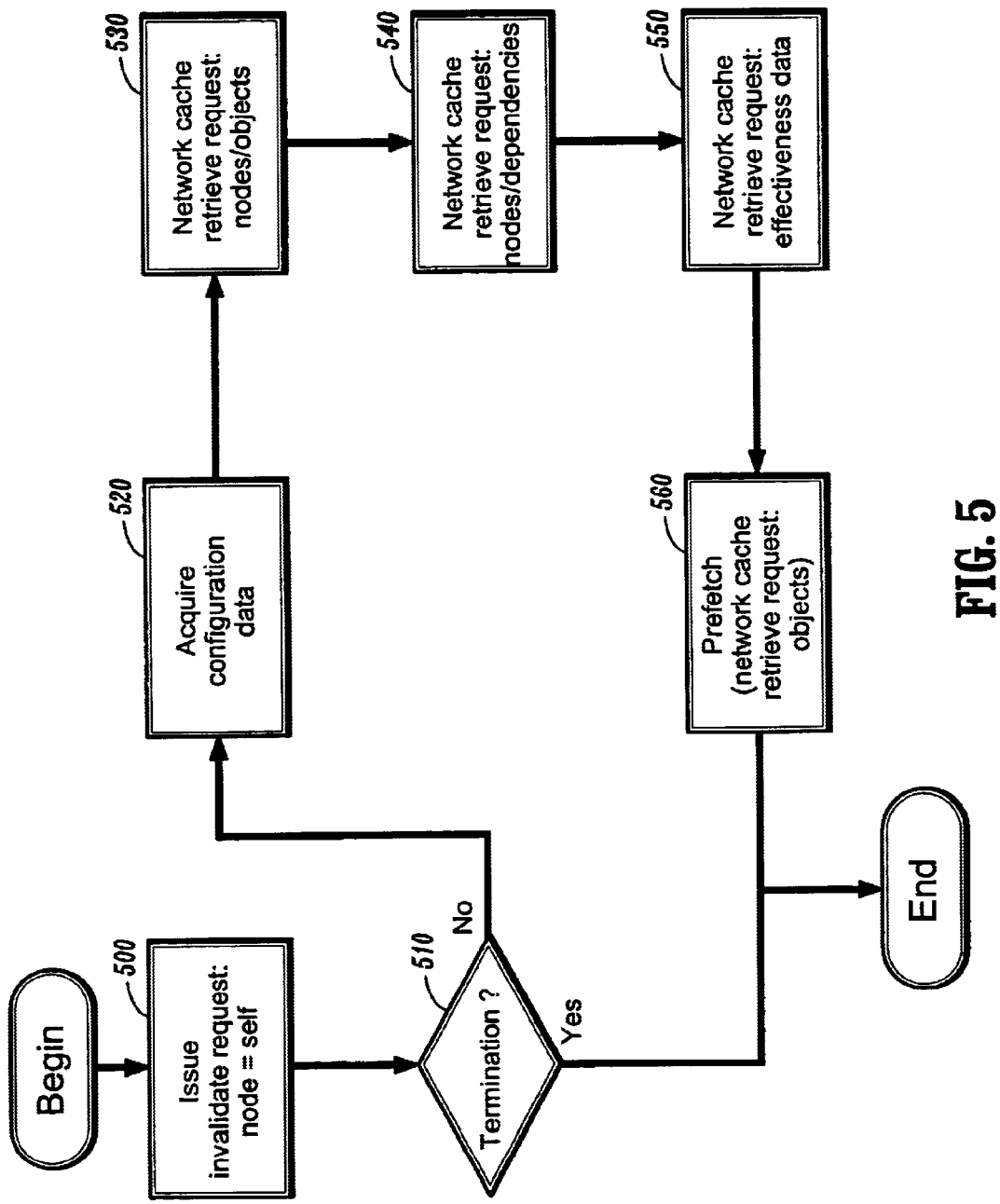
FIG. 5 is a flow diagram of an initialization and termination process in accordance with one aspect of the present invention.

Referring now to FIG. 5, a flow diagram illustrates a method of initialization/termination of a network cache manager (local and shared) in accordance with one aspect of the present invention, which is preferably implemented by the initialization module 361 (FIG. 3). The process begins by issuing an invalidate node request (step 500) to inform all interested peer network cache managers that the node is either starting or terminating, which allows each of the interested peer network cache managers to expel old directory information quickly and efficiently.

Next, if the network cache manager is terminating (affirmative decision is step 510), then no further processing is required and the process is complete. If the network cache manager in not terminating (negative determination in step 510) then further processing is required, and control flows to acquire configuration data (step 520) from the configuration module 362. The configuration data comprises discovery of peer network cache managers.

Next, cache retrieve requests (steps 530 and 540) are performed by the network cache manager to gather information necessary to initialize the local directory of the network cache manager. Typically, such requests are made to one or possibly more peer network cache managers, if any. If no other network cache manager is active, then no requests are made. The node, object, and dependency information that is returned to the network cache manager by the peer network cache manager(s) is placed appropriately into the associated network cache manager directory. This locally maintained information allows the network cache manager to independently determine where to send invalidation notifications and where particular cached objects exist.

Then, process flow continues to gather effectiveness data (step 550) from (typically) one or (possibly) more peer network cache managers. As explained above, the effectiveness data is used to determine which objects are the best candidates for caching. Lastly, based on configuration and effectiveness data, objects are prefetched into the local cache managed by the network cache manager from either a peer network cache manager or an actual data source (step 560).

Figure 6:
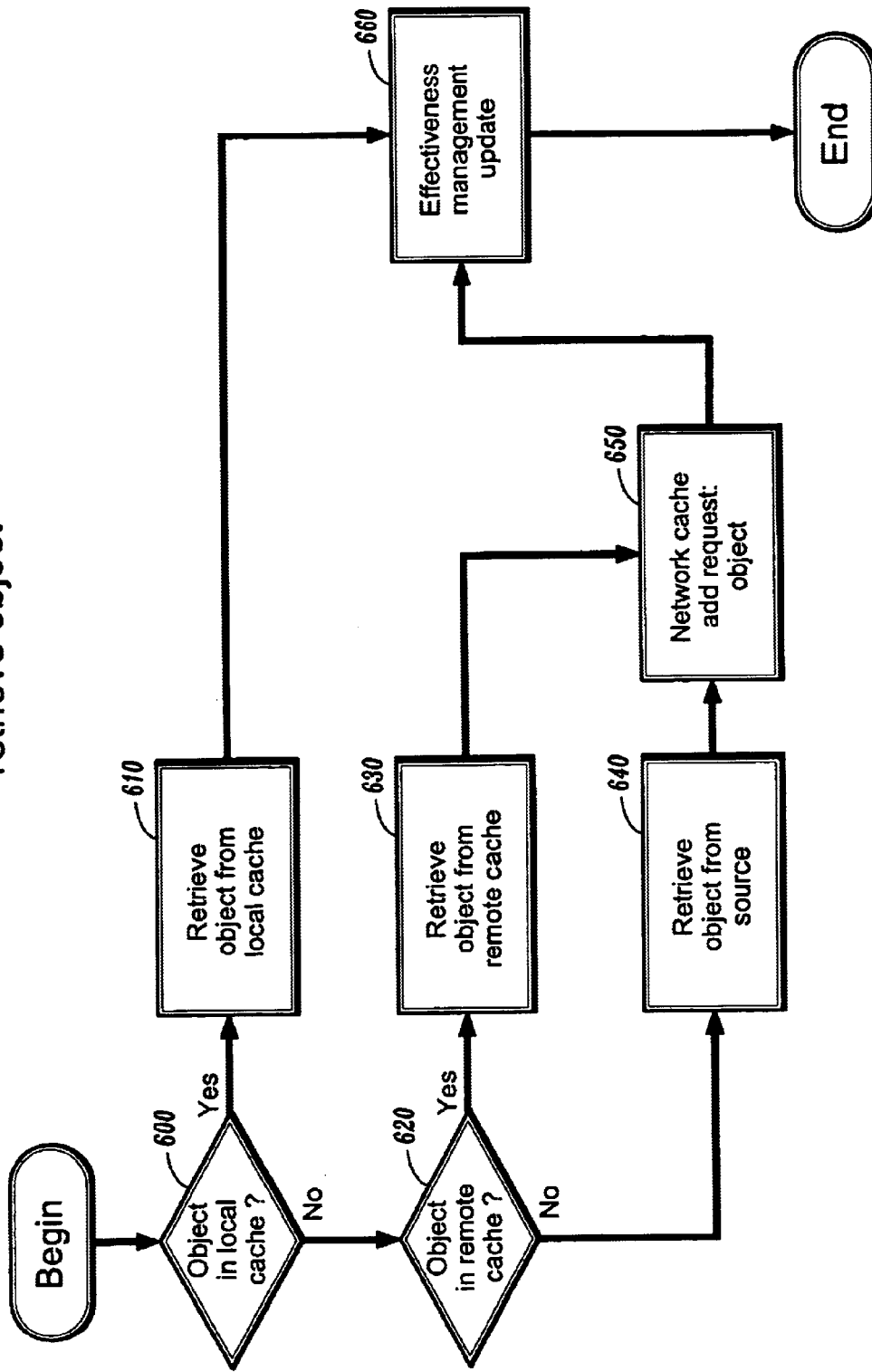
FIG. 6 is a flow diagram of an object retrieval process in accordance with one aspect of the present invention.

Referring now to FIG. 6, a flow diagram illustrates a directory management process for retrieving an object in accordance with one aspect of the present invention. The process begins with a determination as to whether a desired object exists within the local cache (step 600). If the object currently exists in the cache (affirmative determination in step 600), the object is retrieved from the local cache (step 610) and the current statistics for effectiveness management are updated (step 660). On the other hand, if the desired object does not currently exist in the cache (negative determination in step 600) then the directory maintained by the cache manager is consulted to determine (e.g., via the ODG and node information, or any other suitable scheme) if the object is cached in a peer remote cache (step 620). If the object does exist in a peer remote cache (affirmative determination is step 620) then the object is retrieved from the peer remote cache (step 630) and the process flow proceeds to request addition of the object to the local cache (step 650). If, on the other hand, the object does not exist in a peer remote cache (negative determination in step 620) then the object is retrieved from a data source (step 640) and process flow proceeds to request addition of the object to the local cache (step 650).

Preferably, the request to add the object to the local cache (step 650) comprises determining whether or not it is effective to cache the object based upon gathered statistics (as discussed above with respect to FIGS. 2a and 2b). If, during such determination, the minimum desirability requirements are met, the object will be cached locally and the current statistics for effectiveness management are updated (step 660).

Figure 7:
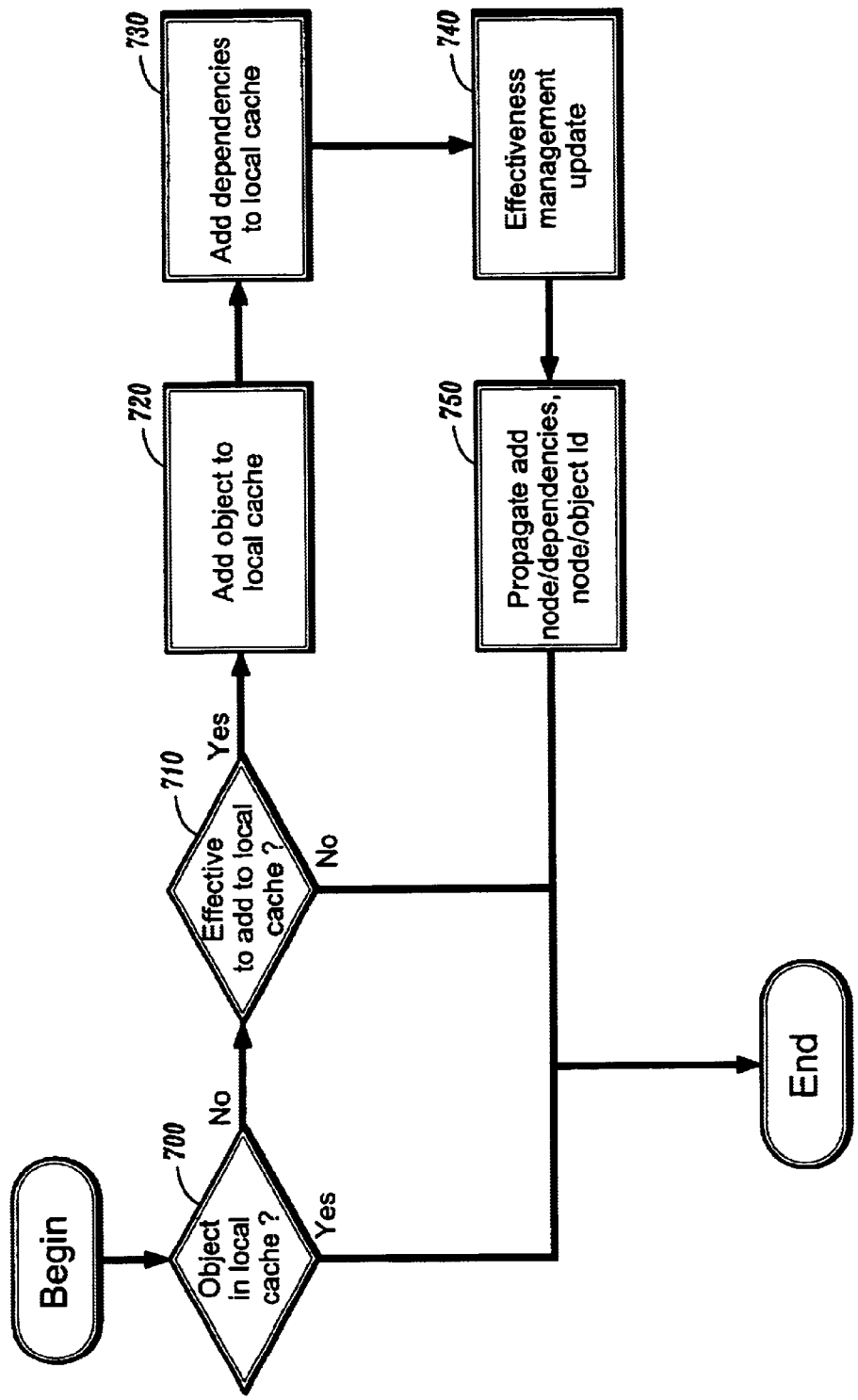
FIG. 7 is a flow diagram of an object addition process in accordance with one aspect of the present invention.

Referring now to FIG. 7, a flow diagram illustrates a directory management process for adding an object in accordance with one aspect of the present invention. The process begins by determining if the desired object exists within the local cache (step 700). If the object does currently exist in the cache (affirmative determination in step 700) then the process is complete. If the object does not currently exist in the cache (negative determination in step 700) then a determination is made as to whether or not it is effective to store the object in the local cache (step 710). Again, this determination (step 710) utilizes the statistic and desirability factors described in FIGS. 2a and 2b.

If it is not effective to store the object in the local cache (negative determination in step 710) then the process is complete. On the other hand, if it is effective to store the object in the local cache (affirmative determination in step 710) then the object is added to the local cache (step 720) and dependencies are added to the local cache (step 730) (i.e., the associated ODG is updated). Next, the current statistics for effectiveness management are updated (step 740). Finally, the added dependencies and added object identification are propagated (step 750) via messages to other network cache manager peers so that each of the network cache manager peers can appropriately update the associated ODG to include the new dependencies (step 750 is discussed in greater detail below with reference to FIG. 10).

Figure 8:
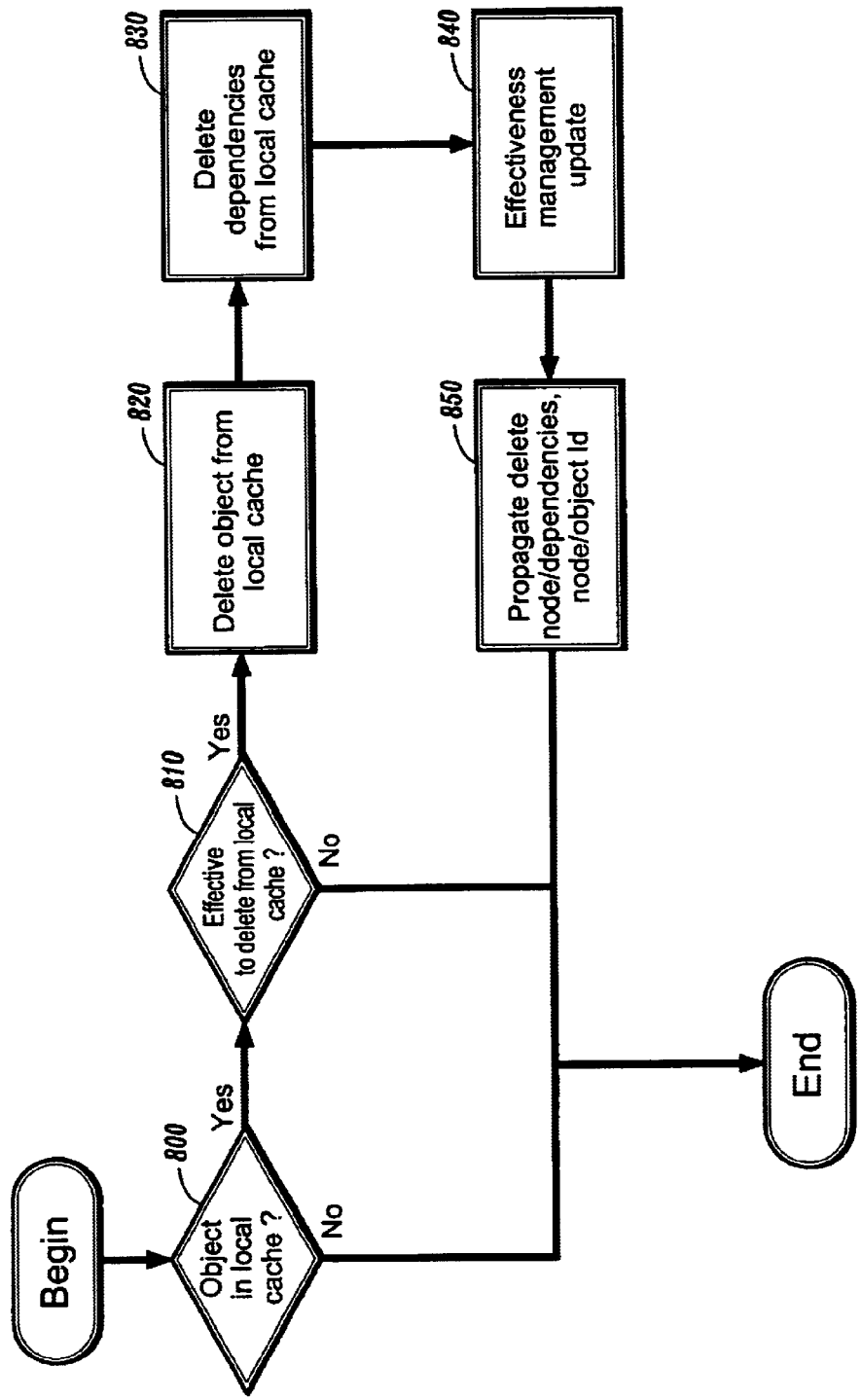
FIG. 8 is a flow diagram of an object deletion process in accordance with one aspect of the present invention.

Referring now to FIG. 8, a flow diagram illustrates a directory management process for deleting an object in accordance with one aspect of the present invention. The process begins by determining if the desired object exists within the local cache (step 800). If the object does not currently exist in the cache (negative determination in step 800), then the process is complete. If the object does currently exist in the cache (affirmative determination in step 800) then a determination is made as to whether or not it is effective to remove the object from the local cache (step 810), preferably using the statistics and desirability factors described above in FIGS. 2a and 2b.

If it is not effective to remove the object from the local cache (negative determination in step 810) then the process is complete. If it is effective to remove the object from the local cache (affirmative determination in step 810) then the object is deleted from the local cache (step 820) and the corresponding dependencies (in the ODG) for the deleted object are removed from the local cache (step 830). Then, the current statistics for effectiveness management are updated,(step 840). Finally, the dependencies and object identification are propagated (step 850) via messages to other network cache manager peers so that each of the network cache manager peers can appropriately update the associated ODG to remove such dependencies from their ODG (step 850 is discussed in greater detail below with reference to FIG. 10).

Figure 9:
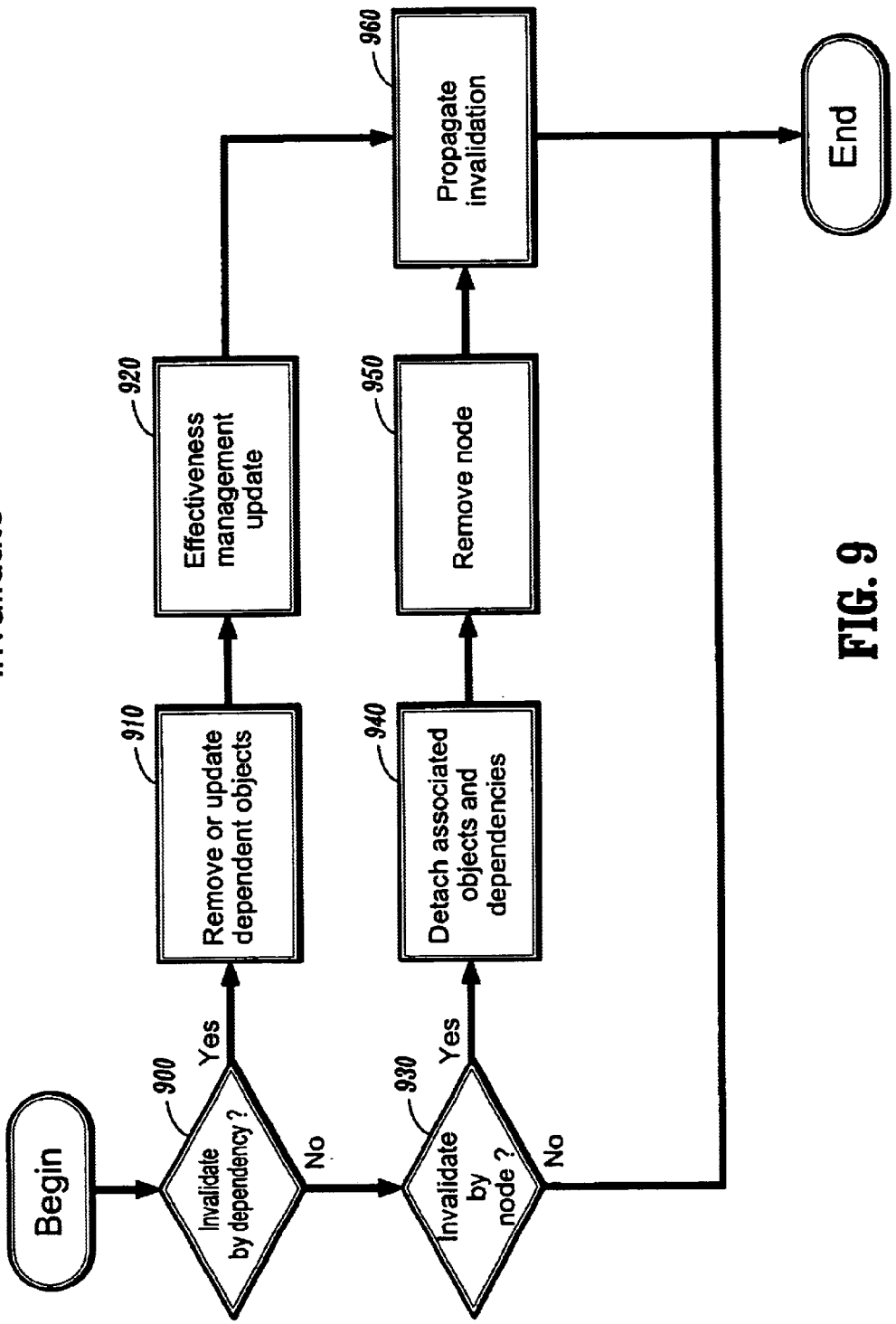
FIG. 9 is a flow diagram of an object invalidation process in accordance with one aspect of the present invention.

Referring now to FIG. 9, a flow diagram illustrates a directory management process for invalidating an object in accordance with one aspect of the present invention. Invalidation events comprise instance creation, instance deletion and instance attribute change. The process begins by determining if a dependency invalidation event has occurred (i.e., the underlying data for a given object has changed) (step 900). If the invalidation is by dependency (affirmative determination in step 900) then the dependent object or objects are removed or updated in the cache (step 910). The current statistics for effectiveness management are then updated (step 920). And process flow proceeds to propagate the invalidation (step 960) as discussed in detail in FIG. 10.

If the invalidation is not by dependency (negative determination in step 900), a determination is then made as to whether the invalidation is by node (step 930) (wherein a node within the network of caches has either shutdown or is coming online). If the invalidation is by node (affirmative determination in step 930), then the objects and dependencies associated with the node are detached (step 940) and the node ID is removed (step 950) from the directory. Then, process flow proceeds to propagate the invalidation event (step 960). For propagation invalidation (step 960), peer network cache managers are notified of the invalidation and the process is complete. On the other hand, if the invalidation is not by node (negative determination in step 930) then the process is complete.

Figure 10:
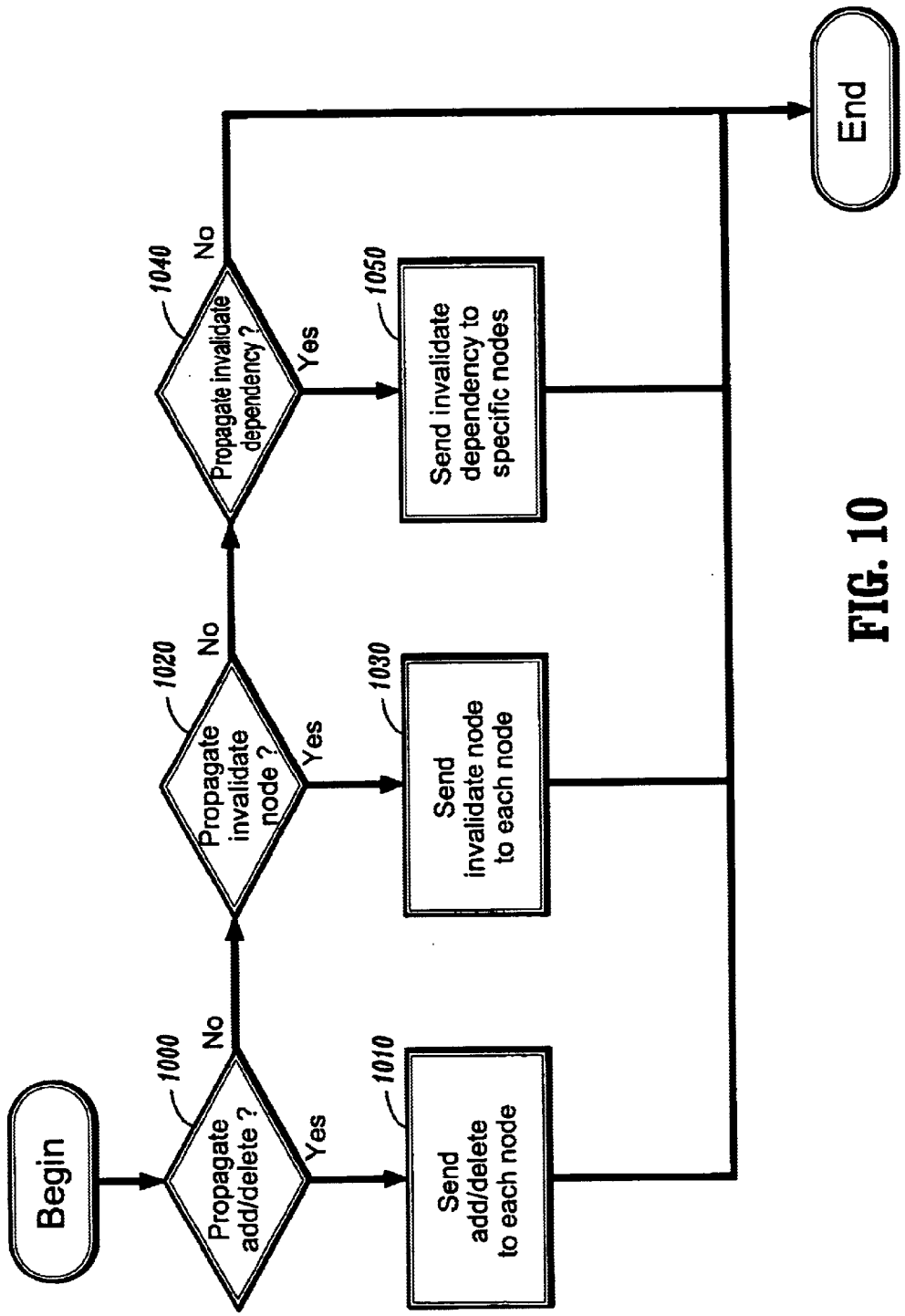
FIG. 10 is a flow diagram of a propagation process in accordance with one aspect of the present invention.

Referring now to FIG. 10, a flow diagram illustrates a method of propagation in accordance with one aspect of the present invention. A preferred propagation process generally involves sending notification messages from a given network cache manager to other network cache managers when an event such as object creation, object deletion, and/or object invalidation occurs at a node associated with the given network cache manager, since such an event can potentially effect the integrity of cached data on another node. A preferred propagation process begins by determining if the propagation is associated with an add or delete event (step 1000). If the propagation is associated with an add or delete event (affirmative determination in step 1000) then a notification message for the add or delete event is sent (step 1010) to each peer network cache manager (if any) so that each of the peer network cache managers can update their ODG accordingly, and the process is complete.

If the propagation is not associated with an add or delete event (negative determination in step 1000) then it is determined if the propagation is associated with an invalidation by node event (step 1020). If the propagation is associated with an invalidation by node event (affirmative determination in step 1020), then an invalidation by node message is preferably sent (step 1030) to each peer network cache manager (if any) so that each of the peer network cache managers can update their ODG accordingly, and the process is complete.

If the propagation is not associated with an invalidation by node event (negative determination in step 1020) then it is determined if the propagation is associated with an invalidation by dependency event (step 1040). If the propagation is associated with an invalidation by dependency event (affirmative determination in step 1040) then an invalidation by dependency message is sent (step 1050) only to peer network cache managers (if any) that utilize the dependency and the process is complete. If the propagation is not associated with an invalidation by dependency event (negative determination in step 1040) then the process is complete.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for managing a plurality of caches distributed in a network, comprising the steps of:
    maintaining, by each cache, a plurality of statistics associated with a cacheable object, wherein the statistics associated with the cacheable object comprise an access frequency (A(o)), an update frequency (U(o)), an update cost (C(o)), and a cost to fetch the cacheable object from a remote source (F(o));
    computing, by each cache, an associated metric using said statistics, wherein the associated metric quantitatively assesses the desirability of caching the cacheable object; and
    utilizing, by a given cache, the associated metric to make caching decisions associated with the cacheable object.

2. The method of claim 1, wherein the plurality of caches comprise a plurality of caches local to specific entities and at least one cache shared by the entities.

3. The method of claim 1, wherein an associated metric of a given cache comprises $d1(o)=A(o)*F(o)-U(o)*C(o)$.

4. (Original) The method of claim 3, wherein the step of utilizing an associated metric of a given cache to make caching decisions comprises caching the cacheable object if the associated metric $d1(o)$ is a positive value.

5. The method of claim 1, wherein an associated metric of a given cache comprises $d2(o)=(A(o)*F(o)-U(o)*C(o))/\text{size}(o)$, wherein size(o) comprises a size of the cacheable object.

6. The method of claim 5, further comprising the step of removing a cached object having a smallest value of $d2(o)$ associated therewith to provide space for a current cacheable object stored in the cache.

7. The method of claim 1, wherein the step of computing an associated metric comprises the step of updating the associated metric of a cached object upon the occurrence of a trigger event, wherein the trigger event comprises one of an access of the cached object, an update of the cached object, and an invalidation of the cached object.

8. The method of claim 1, wherein the method steps are tangibly embodied as program instructions on a program storage device, wherein the program instructions are readable and executable on a machine to perform the method steps.

9. A method for managing a cacheable state shared between a plurality of caches associated with communicating processes, comprising the steps of:
    caching, by a process, an object in a cache associated with the process;
    maintaining, by the process, dependency information associated with the cached object;
    utilizing, by the process, the dependency information of the cached object to determine if the cached object is affected by a change to underlying data; and
    updating all caches associated with other processes containing the cached object, if the cached object is affected by a change to underlying data,
    wherein the dependency information is maintained by the process in an ODG (object dependence graph).

10. The method of claim 9, further comprising the step of caching at least part of the object dependency information in a cache.

11. The method of claim 9, wherein the step of caching the object comprises:
    computing, by the process, an associated metric to quantitatively assesses the desirability of caching the object; and
    caching the object if it is desirable based on the computed metric; and
    propagating the dependency information associated with the cached object to another associated process.

12. The method of claim 9, wherein the method steps are tangibly embodied as program instructions on a program storage device, wherein the program instructions are readable and executable on a machine to perform the methods steps.

13. A method for managing a cacheable state shared between a plurality of caches associated with communicating processes, comprising the steps of:

caching, by a process, an object in a cache associated with the process;

maintaining, by the process, dependency information associated with the cached object;

utilizing, by the process, the dependency information of the cached object to determine if the cached object is affected by a change to underlying data; and updating all caches associated with other processes containing the cached object, if the cached object is affected by a change to underlying data, wherein the process comprises a clone.

14. The method of claim 13, wherein the method steps are tangibly embodied as program instructions an a program storage device, wherein the program instructions are readable and executable on a machine to perform the method steps.

15. The method of claim 13, further comprising the step of caching at least part of the object dependency information in a cache.

16. The method of claim 13, wherein the step of caching the object comprises:

computing, by the process, an associated metric quantitatively assesses the desirability of caching the object; and caching the object if it is desirable based on the computed metric; and propagating the dependency information associated with the cached object to another associated process.

17. A method for managing a cacheable state shared between a plurality of caches associated with communicating processes, comprising the steps of:

catching, by a process, an object in a cache associated with the process;

maintaining, by the process, dependency information associated with the cached object;

utilizing, by the process, the dependency information of the cached object to determine if the cached object is affected by a change to underlying data; and updating all caches associated with other processes containing the cached object, if the cached object is affected by a change to underlying data; and deleting the cached object, wherein the step of deleting the cached object comprises:

computing, by the process, an associated metric to quantitatively assesses the desirability of deleting the cached object;

deleting the cached object and the associated dependency information, if it is desirable based on the computed metric; and propagating the deleted dependency information associated with the deleted cached object to another associated process.

18. The method of claim 17, wherein the method steps are tangibly embodied as program instructions on a program storage device, wherein the program instructions are readable and executable on a machine to perform the method steps.

19. The method of claim 17, further comprising the step of caching at least part of the object dependency information in a cache.

20. The method of claim 17, wherein the step of caching the object comprises:

computing, by process, an associated metric to quantitatively assesses the desirability of caching the object; and caching the object if it is desirable based on the computed metric; and propagating the dependency information associated with the cached object to another associated process.

21. A system for managing networked caches, comprising:

a plurality of communicating processes, wherein each communicating process is associated with a cache; and a cache manager, associated with each process, for managing the associated cache and maintaining dependency information for each object stored in the cache, wherein the cache manager is adapted to share the dependency information among other communicating processes, wherein at least one communicating process comprises a shared cache manager that maintains a shared cache and shared dependency information associated with all of the communicating processes, and wherein the shared dependency information comprises a shared ODG (object dependency graph) that is accessible by each of the cache managers associated with the communicating process for maintaining dependency information.

22. The system of claim 21, wherein at least one cache manager locally maintains a portion of the shared ODG.

23. A system for managing networked caches, comprising:

a plurality of communicating process, wherein each communicating process is associated with a cache; and a cache manager, associated with each process, for managing the associated cache and maintaining dependency information for each object stored in the cache, wherein the cache manager is adapted to share the dependency information among other communicating processes, wherein the communicating processes comprise clones.

24. The system of claim 23, wherein at least one communicating process comprises a shared cache manager that maintains a shared cache and shared dependency information associated with all of the communicating processes.

* * * * *